United States Patent
Lang et al.

(10) Patent No.: US 12,554,689 B2
(45) Date of Patent: Feb. 17, 2026

(54) DETECTING HIGH-IMPACT DATA QUALITY RULES AND POLICIES FROM DATA CLEANSING STEPS

(71) Applicant: INTERNATIONAL BUSINESS MACHINES CORPORATION, Armonk, NY (US)

(72) Inventors: Alexander Lang, Stuttgart (DE); Albert Maier, Tuebingen (DE); Werner Schuetz, Nufringen (DE); Sergej Schuetz, Stuttgart (DE); Martin Anton Oberhofer, Sindelfingen (DE); Yannick Saillet, Stuttgart (DE); Mike W. Grasselt, Leinfelden-Echterdingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/333,341

(22) Filed: Jun. 12, 2023

(65) Prior Publication Data

US 2024/0411736 A1    Dec. 12, 2024

(51) Int. Cl.
*G06F 16/215* (2019.01)
*G06F 16/25* (2019.01)

(52) U.S. Cl.
CPC .......... *G06F 16/215* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 9,852,164 | B2 | 12/2017 | Bentley |
| 9,852,166 | B2 | 12/2017 | Bentley |

(Continued)

FOREIGN PATENT DOCUMENTS

| | | | |
|---|---|---|---|
| EP | 3575980 A2 | 12/2019 | |
| WO | 2012080077 A1 | 6/2012 | |

OTHER PUBLICATIONS

Chiang, et al., "Discovering Data Quality Rules", PVLDB '08, Aug. 23-28, 2008, Auckland, New Zealand, ACM, pp. 1166-1177, ResearchGate, 13 pgs., <https://www.researchgate.net/publication/220538738_Discovering_data_quality_rules>.

(Continued)

*Primary Examiner* — Taelor Kim
(74) *Attorney, Agent, or Firm* — Lily Neff

(57) ABSTRACT

A method, computer system, and a computer program product are provided for cleansing steps. These are in accordance with existing data quality and rules in existence for using a plurality of different transformation assets. Information is obtained about a plurality of different transformation assets and their associated data quality and rules are extracted. A plurality of possible cleansing steps to be performed are identified for the plurality of different transformation assets. An analysis is performed for the identified cleansing steps, on impact on the different transformation assets. It is then determined when more than one identified step has a similar semantics across the plurality of different transformation assets and when more than any two of them need to perform a similar step across the same dataset. The relevance of each cleansing step to be performed is then determined and a cleansing step order of performance is provided.

15 Claims, 2 Drawing Sheets

(56) References Cited

U.S. PATENT DOCUMENTS

| | | | | |
|---|---|---|---|---|
| 2004/0107203 | A1* | 6/2004 | Burdick | G06F 16/2365 |
| 2016/0034502 | A1* | 2/2016 | Dupey | G06F 16/215 |
| | | | | 707/688 |
| 2016/0070724 | A1* | 3/2016 | Marrelli | G06F 16/84 |
| | | | | 707/692 |
| 2019/0095801 | A1* | 3/2019 | Saillet | G06N 5/04 |
| 2020/0380379 | A1 | 12/2020 | Tatti | |
| 2021/0240677 | A1 | 8/2021 | Kashalikar | |

OTHER PUBLICATIONS

Oberhofer, et al., "Machine Learning Applied to the Clerical Task Management Problem in Master Data Management Systems", BTW 2019: 419-431, [accessed Jul. 3, 2023], 3 pgs., Retrieved from the Internet: <https://dblp. org/rec/conf/btw/OberhoferBC19.html>.

Salem, et al., "Fixing Rules for Data Cleaning Based on Conditional Functional Dependency", Future Computing and Informatics Journal 1 (2016) 10-26, Apr. 6, 2017, Future University in Egypt, Elsevier B.V., 17 pgs., <https://www.sciencedirect.com/science/article/pii/S2314728817300041>.

Mahdavi, et al., "Towards Automated Data Cleaning Workflows", CEUR-WS.org, Proceedings of the Conference on 'Lernen, Wissen, Daten, Analysen', LWDA 2019, Berlin, Germany, Sep. 30-Oct. 2, 2019, pp. 10-19, <https:// ceur-ws.org/Vol-2454/paper_8.pdf>.

Pandas, "Working with Missing Data", Pandas, [accessed Mar. 31, 2023], 25 pgs., Retrieved from the Internet: <https://pandas.pydata.org/docs/user_guide/missing_data.html>.

* cited by examiner

DETECTING HIGH-IMPACT DATA QUALITY RULES AND POLICIES FROM DATA CLEANSING STEPS

BACKGROUND

The present invention relates generally to the field of data management and more particularly to techniques for data cleansing steps.

Data management provides many challenges. The rise of data science has significantly increased these challenges. Large enterprises have data assets covering millions of data columns. Therefore, there is a need to manage double-digit to triple-digit millions of data columns in data assets in these enterprises. Attempts to manually write data quality rules often yields thousands and thousands of data rules. This may cause difficulties in writing and testing programs and problems in maintaining accurate data over time.

Many data scientists spend a substantial amount of their time dealing with data cleansing activities. In large enterprises, due to the volume of data, data cleansing activities are very challenging and complicated. Even when using automated means like machine learning, a large amount of effort is dedicated to producing data cleansing codes. A toolchain is a set of software development tools used to complete complex software development tasks to deliver a product. Many of the data quality problems remain especially when dealing with the detection and correction of conflicting codes that are buried in these toolchains.

SUMMARY

Embodiments of the present invention disclose a method, computer system, and a computer program product for providing cleansing steps for a plurality of different transformation assets. Information is obtained about the plurality of different transformation assets. Associated data is then extracted for the different transformation assets. Possible cleansing steps to be performed are then determined for the different transformation assets. In addition, their impact on the different transformation assets is analyzed. Any cleansing steps to be performed that have the same semantics are identified. It is also determined as how many different transformation assets perform a particular cleansing step on similar data and an output is generated for performing the cleaning steps that are duplicated for similar data.

BRIEF DESCRIPTION OF THE SEVERAL VIEWS OF THE DRAWINGS

These and other objects, features and advantages of the present invention will become apparent from the following detailed description of illustrative embodiments thereof, which may be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
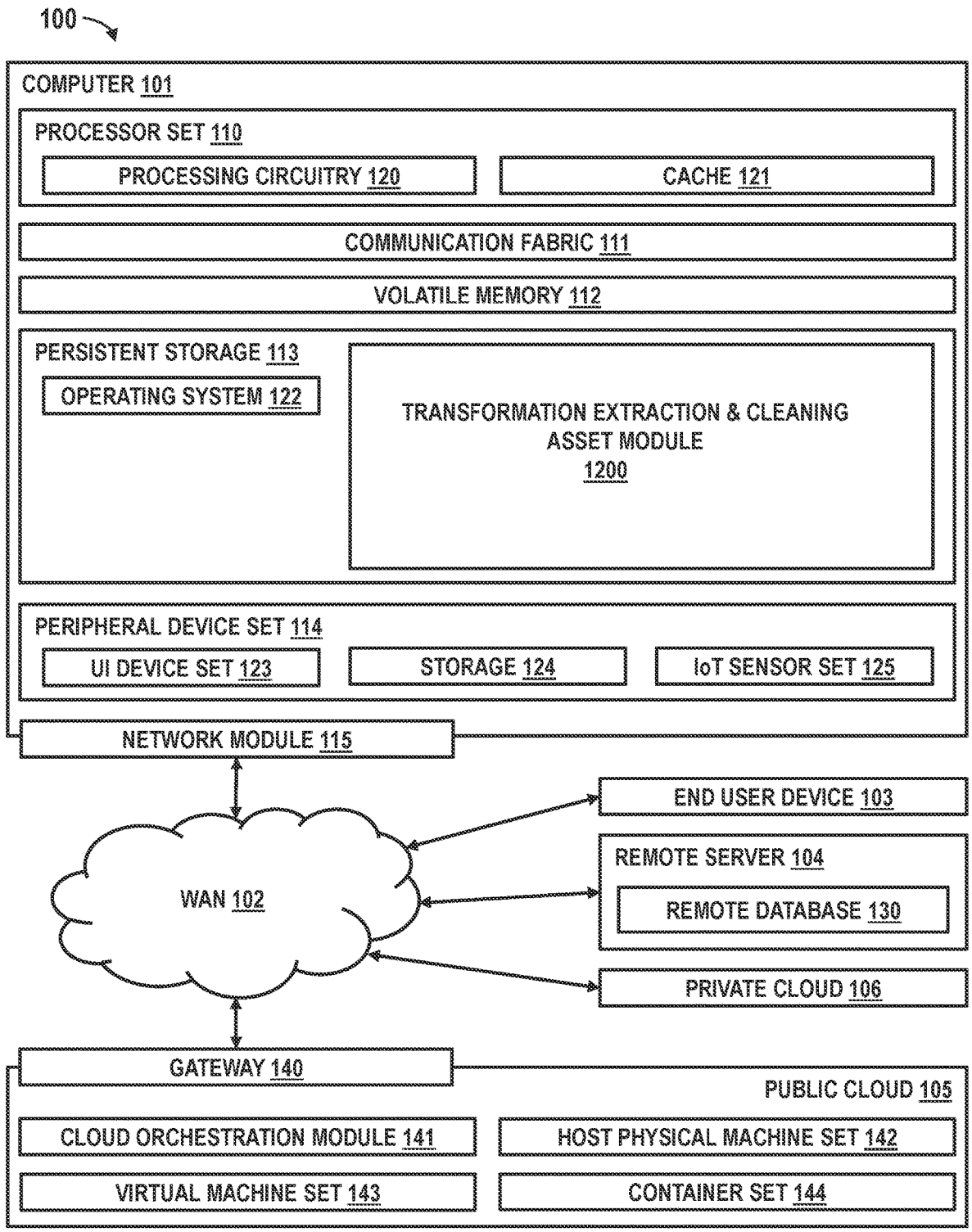
FIG. 1 illustrates a networked computer environment, according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing an transformation extraction and cleansing asset module (1200). In addition to this block 1200, computing environment 100 includes, for example, computer 101, wide area network (WAN) 102, end user device (EUD)

103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
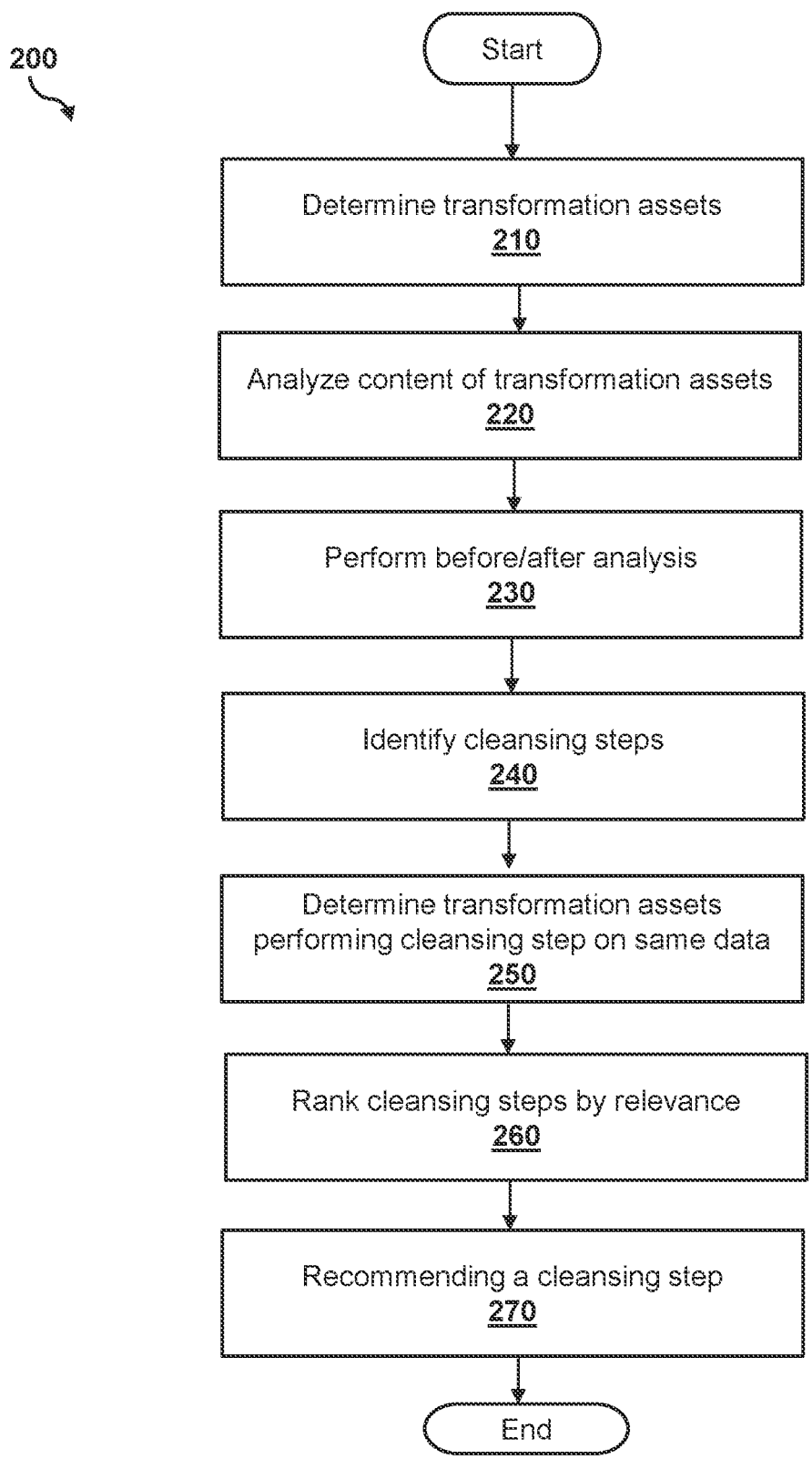
FIG. 2 provides an operational flowchart used for determining cleansing steps according to data quality and rules, according to one embodiment.

FIG. 2 provides an asset transformation extraction and cleansing step process 200. As discussed earlier, there may be a problem with detection and correction of the code by the programming (especially data science) teams curating data such as for artificial intelligence (AI) and other similar processes. This may be due to the large amount of data needed for these processes. Attempts to manually write data quality rules may yield thousands of data rules, which may create an even bigger issue. In one embodiment, process 200 provides a technique that shifts efforts from manual data quality policy and rule authoring to Artificial Intelligence (AI) based data quality policy and rule authoring. The AI may also be self learning using and teaching a plurality of Machine Learning (ML) engines.

Applying the detected rules and policies to all data assets (where applicable) automatically, will help shift the data management from a re-active to a pro-active data quality process. In other words, for the same semantical data domain, the creation of conflicting and inconsistent data quality policy and rules may be prevented. Data quality policies and rules can be created automatically from existing data cleansing efforts being done. Improved consistency may also be achieved on data quality policies and data quality rules as applied to data assets in the same domain. Improved ML model results may also be provided by being alerted when there is a need to be retrained due to significant changes in data quality. This allows for reusing of the implemented code to improve data quality in each ecosystem.

In Step 210 of process 200, information about any transformation assets may be determined to extract data quality (DQ) and policy rules. This may be performed in a variety of manners. For example, in one embodiment, this step may be provided in two stages. In stage 1) a plurality of the user points may be determined to a set of transformation assets. In stage 2) the catalog may be used to analyze the lineage information of columns of certain data assets (from the catalog, the transformation assets can be obtained that were involved in creating the asset). In this scenario, the process may also use the term-asset relationships. In one example, this may be entail existing or pre-existing data quality rules for certain columns that will be retrieved. (In one embodiment, this is subsequently used so the process can suggest data quality (DQ) rules and policies that are not already covered by existing rules—and it can also highlight rules that are apparently not enforced, because it finds cleansing steps that should be superfluous if the rule were enforced).

In one embodiment, the process 200 obtains, as input, a metadata catalog comprised of data quality policies and data quality rules. The data quality policy describes an objective of data quality management (such as completeness, format, etc.) A plurality of data quality rule(s) allow the measurement on attributes/columns against that objective to be obtained. Terms and related data classes may also be provided. These define a data domain or data concept. Assets may be reviewed based on metadata describing data assets (think of tables in relational databases, models for NoSQL stores, etc.), data connection objects, etc. Term asset relationships may be defined as a relationship that indicates an asset is an instance of a data concept. (For example, the term "social security number" may be assigned to a column means that the values of that column are instances of social security numbers.). In addition, one or more features can be considered. Features may represent on data assets that one or multiple attributes/columns may be useful as a feature of a certain type to be consumed in the training of ML models.

Repositories of data transformation assets can also be used. These assets perform, among other tasks, data cleansing steps that handle missing or incorrect values in data (examples: https://pandas.pydata.org/docs/user_guide/missing_data.html). These transformation assets include, but are not limited to: Data science Jupyter notebooks (e.g., dropna( ) and fillna( ) methods in Python Pandas), SPSS modeler routines (e.g., Filler node), DataStage ETL jobs (design time lineage) and SQL scripts. In addition a Feature store can be provided that contains data assets curated from data sources.

In Step 220, the content of the transformation assets may be analyzed (sometimes referenced as white box approach). In one embodiment, this can include parsing the code of a Notebook (Python, R, Scala) and identifying from a list of known patterns, the cleansing steps (notebook cells that contain one or more cleansing steps) and the specific columns and values that are used. For example, the patterns can be:

<dataframe>.dropna(<column name>)
<dataframe>.fillna(<column name>, <value>)

In addition, the nodes that contain cleansing steps can be identified from a list of "known" nodes (Modeler Flow) as well as the specific columns and values that are used (i.e. "Filler" node). In other embodiments, other types of flows and similar tools can be used (Data Stage Flow). Consequently, the process may not be restricted to any transformation asset types and different cleansing recognizers can be used as can be appreciated by those skilled in the art. In other words, in Step 220, the steps of a transformation asset may run one by one. In one embodiment, this may be performed using a machine learning model (e.g., classification) to first identify steps that perform cleansing ("black-box approach") and then perfume it to completion. In this scenario, the following example may be used to provide a better understanding.

Input to the machine learning algorithm:
the data asset before and after running a the step (e.g., a particular notebook cell, a sub-expression of a SWL script, a node in an ETL flow, . . . ), and the column value distributions before and after the step.
Output:
A binary classification of the step as "cleansing step yes/no". The model is trained on a set of manually classified "before/after" pairs.

In Step 230, a "before and after" type of analysis may be performed on the data assets to assess the impact of the cleaning. In one embodiment, the actual cleaning step itself performs and measures the quantitative impact. In one embodiment, this may include determining the number of rows that were changed or dropped as part of the cleaning process (black box or white box model). In this step, as per one embodiment, the data distribution and data profiling metadata of the asset may also be analyzed in a before and after type transformation. The qualitative impact may also be measured and calculated by comparing the data distribution.

In Step 240, cleansing steps may be identified across transformation assets, especially those transformation assets that have the same semantics (e.g., pandas dropna( ) function and SPSS Modeler "Filler" node). In Step 250, the process identifies how many different transformation assets perform this cleansing on the same data set.

In Step 260, the relevance of each cleansing step may be ranked according to the previous few steps (Step 230-250). In one embodiment, if a cleansing step is performed in a certain percentage (x %) of the data assets that work with data asset A, and the transformation step changes in a certain other percentage (y %) of the rows (gets removed, a row value changes, etc.), then the cleansing step may be determined to be relevant. (X may equal y in some instances).

In one embodiment, in Step 270, the highest cleansing steps (or steps above a certain threshold) may be provided (suggested in one embodiment) as data policies and data quality rules of the data steward. This may be considered as an output product. In one embodiment, the process may also create an automated cleansing step and subsequently add it to the catalog.

In an alternate embodiment, the workflow of the invention can also be used as an "early warning system" for data quality issues. In one example, the scenario provides a set of N transformation assets that use data asset A. This information can come from the catalog. At a given point, the process then detects that M transformation assets get updated with the same cleansing step. In such a case, the process then provides and alert (such as to a data steward). In one embodiment this may be provided as an emerging data quality issue.

In one embodiment, an AI "Factsheet" may also be incorporated that includes Metadata for an ML model describing on which data asset it was trained, who trained it, when trained. In addition, Design time lineage can mean to refers to the metadata description of ETL routines allowing to understand where the data is coming from, where the data is going to and what transformations, including data cleansing operations have been applied to the data.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for providing cleansing steps when using a plurality of different transformation assets, comprising:
    obtaining information about availability of a plurality of different transformation assets;
    analyzing content of said plurality of different information assets one by one;
    determining a plurality of possible cleansing steps to be performed on said plurality of different transformation assets, wherein an analysis is performed on said plurality of different transformation assets based on asset relationships and a plurality of asset lineage information to determine the possible cleansing steps to be performed;
    analyzing said plurality of cleansing steps to determine their impact on different transformation assets;
    determining one or more cleansing steps that must be performed across said plurality of different transformation assets having a same semantic data;
    determining how many of said plurality of different transformation assets need to perform a particular cleansing step on said same semantic data;
    ranking a relevance of each cleansing step previously determined that must be performed at least according to identifying a same semantics value that is shared amongst said plurality of different transformation assets performing said same cleansing step on said same semantic data,
    wherein the ranking of a relevance of said each cleansing step is determined according to a number of identified said plurality of different transformation assets that are to perform said same cleansing steps on said same semantic data; and
    generating an output product including any with a plurality of cleansing steps above a certain threshold and based on data policies and data quality rules.

2. The method of claim 1, further comprising performing an analysis performed on data assets is a before and after assessment of impact of each cleaning step to be performed.

3. The method of claim 1, wherein said plurality of different transformation assets are selected by obtaining and analyzing metadata from a catalog, said information including a plurality of lineage information of columns of certain data assets in said catalog.

4. The method of claim 3, wherein said different transformation assets selected are used in creating an entry in said catalog.

5. The method of claim 1, further comprising: analyzing content of said different transformation assets.

6. The method of claim 1, further comprising: executing a plurality of steps for each different transformation asset, and using a machine learning model to identify any steps that perform a cleansing function.

7. A computer system for providing cleansing steps when using a plurality of different transformation assets, comprising:
    one or more processors, one or more computer-readable memories and one or more computer-readable storage media;
    program instructions, stored on at least one of the one or more storage media for execution by at least one of the one or more processors via at least one of the one or more memories, to obtain information about availability of a plurality of different transformation assets;
    program instructions, stored on at least one of the one or more storage media for execution by at least one of the one or more processors via at least one of the one or more memories, to analyze content of said plurality of different information assets one by one;
    program instructions, stored on at least one of the one or more storage media for execution by at least one of the one or more processors via at least one of the one or more memories, to determine a plurality of possible cleansing steps to be performed on said plurality of different transformation assets, wherein an analysis is performed on said plurality of different transformation assets based on asset relationships and a plurality of asset lineage information to determine the possible cleansing steps to be performed;
    program instructions, stored on at least one of the one or more storage media for execution by at least one of the one or more processors via at least one of the one or more memories, to analyze said plurality of cleansing steps to determine their impact on different transformation assets;
    program instructions, stored on at least one of the one or more storage media for execution by at least one of the one or more processors via at least one of the one or more memories, to determine one or more cleansing steps that must be performed across said plurality of different transformation assets having a same semantic data;
    program instructions, stored on at least one of the one or more storage media for execution by at least one of the one or more processors via at least one of the one or more memories, to determine how many of said plurality of different transformation assets need to perform a particular cleansing step on said same semantic data;
    program instructions, stored on at least one of the one or more storage media for execution by at least one of the one or more processors via at least one of the one or more memories, to rank a relevance of each cleansing step previously determined that must be performed at least according to identifying a same semantics value that is shared amongst said plurality of different transformation assets performing said same cleansing step on said same semantic data, wherein the ranking of a relevance of said each cleansing step is determined according to a number of identified said plurality of different transformation assets that are to perform said same cleansing steps on said same semantic data; and program instructions, stored on at least one of the one or more storage media for execution by at least one of the one or more processors via at least one of the one or more memories, to generate an output product including any with a plurality of cleansing steps above a certain threshold and based on data policies and data quality rules.

8. The computer system of claim 7, wherein said analysis performed on impact of said different transformation assets is a before and after assessment of impact of each cleaning step to be performed.

9. The computer system of claim 7, wherein said plurality of different transformation assets are selected by obtaining and analyzing metadata from a catalog, said information including a plurality of lineage information of columns of certain data assets in said catalog.

10. The computer system of claim 7, wherein said different transformation assets selected are used in creating an entry in a catalog.

11. The computer system of claim 10, wherein said different transformation assets selected were used in creating an entry in said catalog.

12. The computer system of claim 7, further comprising analyzing content of said different transformation assets.

13. The computer system of claim 7, further comprising executing a plurality of steps for each different transformation asset, and using a machine learning model to identify any steps that perform a cleansing function.

14. A computer program product for providing cleansing steps for using a plurality of different transformation assets, the computer program product comprising:

one or more computer readable storage media;

program instructions, stored on at least one of the one or more storage media for execution by at least one or more processors via at least one of the one or more memories, to obtain information about availability of a plurality of different transformation assets;

program instructions, stored on at least one of the one or more storage media for execution by at least one of the one or more processors via at least one of the one or more memories, to analyze content of said plurality of different information assets one by one;

program instructions, stored on at least one of the one or more storage media for execution by at least one of the one or more processors via at least one of the one or more memories, to determine a plurality of possible cleansing steps to be performed on said plurality of different transformation assets, wherein an analysis is performed on said plurality of different transformation assets based on asset relationships and a plurality of asset lineage information to determine the possible cleansing steps to be performed;

program instructions, stored on at least one of the one or more storage media for execution by at least one of the one or more processors via at least one of the one or more memories, to analyze said plurality of cleansing steps to determine their impact on different transformation assets;

program instructions, stored on at least one of the one or more storage media for execution by at least one of the one or more processors via at least one of the one or more memories, to determine one or more cleansing steps that must be performed across said plurality of different transformation assets having a same semantic data;

program instructions, stored on at least one of the one or more storage media for execution by at least one of the one or more processors via at least one of the one or more memories, to determine how many of said plurality of different transformation assets need to perform a particular cleansing step on said same semantic data;

program instructions, stored on at least one of the one or more storage media for execution by at least one of the one or more processors via at least one of the one or more memories, to rank a relevance of each cleansing step previously determined that must be performed at least according to identifying a same semantics value that is shared amongst said plurality of different transformation assets performing said same cleansing step on said same semantic data, wherein the ranking of a relevance of said each cleansing step is determined according to a number of identified said plurality of different transformation assets that are to perform said same cleansing steps on said same semantic data; and program instructions, stored on at least one of the one or more storage media for execution by at least one of the one or more processors via at least one of the one or more memories, to generate an output product including any with a plurality of cleansing steps above a certain threshold and based on data policies and data quality rules.

15. The computer program product of claim 14, wherein said analysis performed on impact of said different transformation assets is a before and after assessment of impact of each cleaning step to be performed.

* * * * *